M. BLUME.
RECEPTACLE COVER AND SPOUT.
APPLICATION FILED JULY 2, 1914.
1,135,758. Patented Apr. 13, 1915.
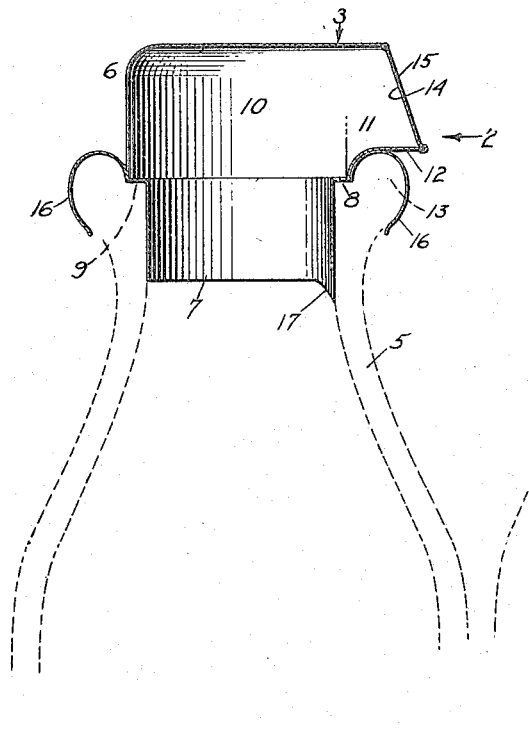
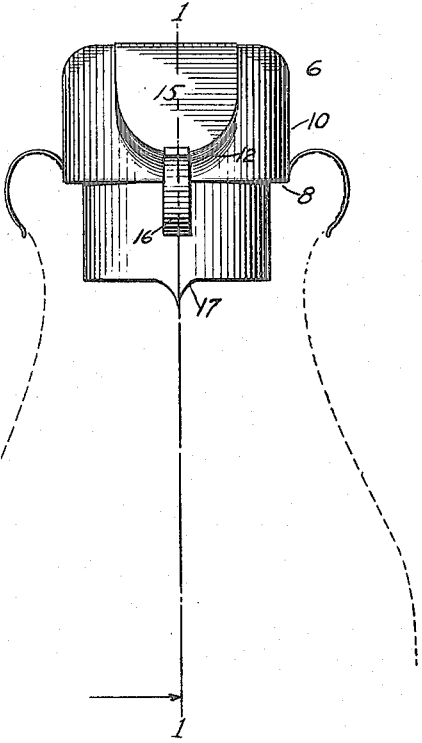
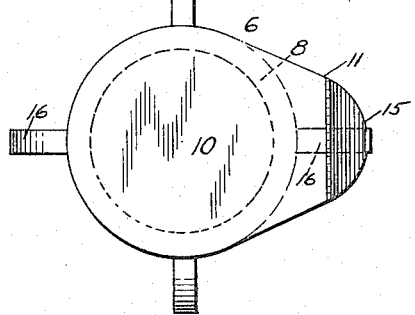
WITNESSES
INVENTOR
Michael Blume.
BY
ATTORNEYS

UNITED STATES PATENT OFFICE.

MICHAEL BLUME, OF NEW YORK, N. Y.

RECEPTACLE COVER AND SPOUT.

1,135,758.  Specification of Letters Patent.  Patented Apr. 13, 1915.

Application filed July 2, 1914. Serial No. 848,585.

*To all whom it may concern:*

Be it known that I, MICHAEL BLUME, a citizen of the United States, and a resident of the city of New York, borough of Brooklyn, in the county of Kings and State of New York, have invented a new and Improved Receptacle Cover and Spout, of which the following is a full, clear, and exact description.

My invention relates to a combination cover and spout for a receptacle, and more particularly for a milk bottle.

The invention further relates to a combination cover and spout for receptacles having means adapted to remove the receptacle stopper before the said combination cover and spout engages the mouth of the receptacle.

The invention also relates to a combination cover and spout having resilient means for removably securing the said combination cover and spout to the receptacle.

The invention is further characterized by the provision of a trap for the spout, closing the same when the bottle is in normal position.

An object of the invention is to provide a simple, strong and inexpensive cover and spout for receptacles which can be easily and quickly secured to or removed from a receptacle and which can be easily cleaned, thus rendering the device sanitary.

A further object of the invention is to provide a combined cover and spout for receptacles which when secured to a receptacle is automatic in its action.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a vertical section on line 1—1, Fig. 2, showing a milk bottle provided with an embodiment of my invention; Fig. 2 is an elevation of a bottle provided with my device, as shown in the direction of the arrow 2 in Fig. 1; and Fig. 3 is a plan view of the device, as indicated by the arrow 3 in Fig. 1.

Referring to the drawings, 5 represent a receptacle in the form of a milk bottle into the mouth of which is fitted a combined cover and spout 6 formed of any suitable light material, such, for example, as aluminum. The cover and spout 6 has an annular member or sleeve 7 adapted to engage interiorly the mouth of the receptacle 5. The upper end of the sleeve 7 is provided with a lateral flange 8 which is adapted to engage the recess 9 of the milk bottle normally engaged by the paper-disk stopper which seals the milk bottle. Integral with the outer edge of the flange 8 is a cap 10 concentric with the sleeve 7 and having an elongated lateral extension 11 forming the spout proper. The bottom 12 of said lateral elongation is round and raised above the flange 8 so as to clear the lip 13 of the milk bottle. The said lateral extension 11 is provided with a lateral opening 14 which is normally covered by a trap 15 hinged to the top of the cap 10, the bottom 12 of the lateral extension 11 extending beyond the point where the trap 15 is hinged, so that gravity normally tends to maintain said trap against the bottom 12, as indicated best in Fig. 1.

Secured to the cap 10 adjacent the flange 8 are pairs of diametrically opposite resilient ears 16 at right angles to each other adapted to engage the lip 13 of the milk bottle, one of the ears 16 being preferably placed under the bottom 12 of the lateral extension 11. Adjacent the lower edge of the sleeve 7 a prong 17 is provided which is preferably integral with said sleeve and which prong is adapted to engage the paper seal and force the same out from its seat in the bottle before the sleeve 7 of the device enters into engagement with the mouth of the bottle.

The device is placed in position as follows: The prong 17 is forced into the seal formed by the paper disk, which is thereby displaced from the recess 9 of the milk bottle and can then be easily removed. The sleeve 7 is then forced into the mouth of the bottle and the ears 16 snap about the lip 13 of the milk bottle, whereby the device is secured to the bottle. To pour the contents out of the bottle it is only necessary to tilt the bottle so as to direct the liquid toward the spout. In tilting the bottle as stated, gravity will displace the trap 15 from the opening 14 in the cap thereby permitting the undisturbed flow of the contents from the bottle through the spout. By restoring the bottle to its normal position, gravity will restore the trap 15 to the position shown in Fig. 1, i. e., closing the spout.

From the above it will be seen that the action of the trap for the spout is automatic. It will be further noted that due to the provision of the resilient ears 16 the device can be easily secured to or removed from the receptacle. The size of the cap 10 is sufficiently large to afford easy access for cleaning and flushing the device, whereby the same is rendered sanitary. The provision of the prong 17 for removing the cork or seal of the receptacle affords a quick application of the device to the receptacle, as it eliminates the necessity for the use of an extra tool for removing the seal.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

In a receptacle cover and spout combined, a sleeve adapted to fit into the mouth of the receptacle, a cap associated with said sleeve forming a cover for the receptacle, means associated with the cap adjacent the sleeve for removably securing the combined cover and spout to the receptacle, said cap having a lateral extension forming a spout, and a trap for said spout hinged to the top of the cap, the bottom of said lateral extension extending beyond the point where the trap is hinged, whereby under the action of gravity said trap is normally maintained against said bottom substantially as and for the purpose set forth.

In testimony whereof I have signed my name to this specification in the presence of two subscribing witnesses.

MICHAEL BLUME.

Witnesses:
MIRIAM BLUME,
DAVID BORUT.

Copies of this patent may be obtained for five cents each, by addressing the "Commissioner of Patents, Washington, D. C."